Dec. 23, 1969   J. M. CREEDON ET AL   3,485,167
PRINT UNIT FOR PRINTING TAPES AND SALES CHECKS
Filed Dec. 21, 1966   4 Sheets-Sheet 4
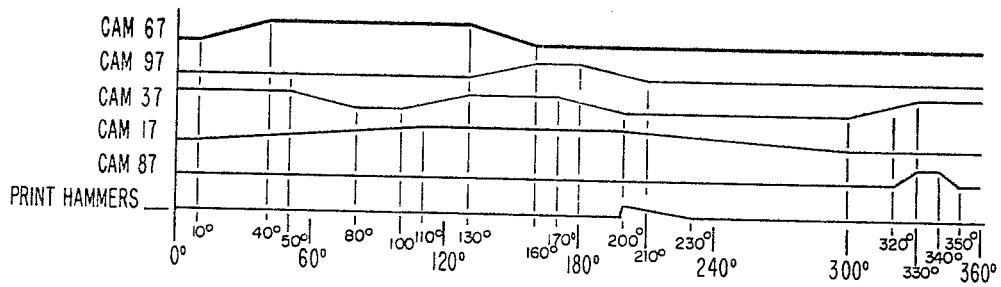
FIG. 6
FIG. 7
FIG. 8
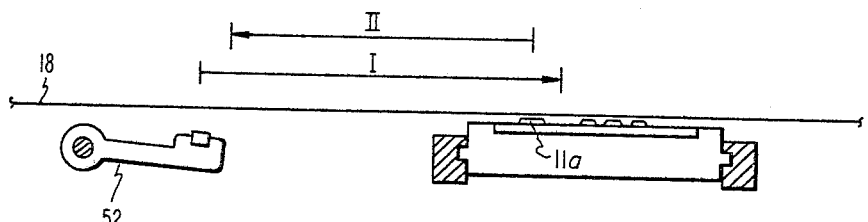
FIG. 9

United States Patent Office 3,485,167
Patented Dec. 23, 1969

3,485,167
PRINT UNIT FOR PRINTING TAPES
AND SALES CHECKS
Jerome M. Creedon, Stewartville, and Joel H. Massey, Rochester, Minn., assignors to International Business Machines Corporation, Armonk, N.Y., a corporation of New York
Filed Dec. 21, 1966, Ser. No. 603,562
Int. Cl. B41f 3/20, 3/00, 3/58; B41l 15/00
U.S. Cl. 101—260                              5 Claims

ABSTRACT OF THE DISCLOSURE

An imprinter is incorporated into a cash register for the purpose of printing customer credit card data onto the cash register journal tape and a sales check during totalization cycles of the register. The imprinter platen roller is driven through two strokes for imprinting. On the first stroke only the customer account number is printed on the journal tape. After the first stroke the sales check is fed to a position overlying the journal tape and credit card and on the second stroke the full credit card data is printed on the sales check. Item listing print stations print a list of the purchased items on the journal tape and sales check during itemization cycles and cooperate with the imprinter during totalization to print totals in predetermined locations on the two documents.

BACKGROUND OF THE INVENTION

This invention relates to a combined imprinting-impact printing unit and, more particularly, to a print unit useful for generating multiple sales documents at the point of sale.

Point of sale recording has traditionally been done by a cash register wherein a plurality of print units are provided for listing the sales data on a journal tape, on a customer receipt tape and on a sales check document. Use of the latter type of document is generally reserved to credit and other types of non-cash-take transactions. The completed sales check includes a printed listing of the customer's name, credit account number and, in many instances, his address. The check further contains a listing or itemization of the merchandise purchased, the prices involved, and applicable totals and additional data such as tax information, discount data, etc.

In recent years, retainers have come to recognize the great potential of credit merchandising and have moved increasingly in a direction toward credit-based operation and away from the traditional cash-based operation. This has brought about the development of the credit card as a device through which credit sales can be handled rapidly, reliably and at relatively low risk. The usual type of credit card in use today is an inexpensive plastic plate having embossed on its surface in right-reading fasion the customer's account number and his name and also often includes his address and other data. The embossed characters on the credit card enables the recordation on the sales check of the credit card data much more rapidly and legibly than if the sales clerk were relied upon to manually copy the data onto the sales check.

The means generally used for transferring the data onto the sales check is a credit card imprinter, which today has become almost as common a point-of-sale recording device as the cash register itself. The credit card imprinter is usually found in the form of a small, self-contained manually operable unit mounted on or near the sales counter somewhere in the vicinity of the cash register. The unit contains some means, usually in the form of a platen roller, for pressing an ink source against the top of the sales check, which is positioned to overlay the credit card. The ink source is usually in the form of an ink ribbon or it may be ink impregnated into the platen roller itself. The pressure of the platen causes ink to be deposited on the sales check in a manner delineating the embossed characters on the credit card and thus provides the required recordation of data on the check.

The present day credit transaction therefore usually constitutes the following operations: a sale check is inserted into the cash register and the items of the sale are rung up. As each item is registered, its price and possible a stock-keeping number identifying the items are printed on the sales check. When the transaction is completed, the total, tax, and other final data is calculated by the cash register and printed on the check. Thereafter, the check is removed from the cash register and taken to the credit card imprinter where the clerk then proceeds with the imprinting operation to transfer the credit card data onto the sales check. Often, when the cash register doesn't have a sales check item printer, or when the clerk doesn't wish to use that feature, the clerk manually writes the items and their prices on the sales check and then rings them up separately on the register. The check is then inserted for printing of totals only for the purpose of validating the check. Of course, separate use of the imprinter is also required.

There are several outstanding drawbacks to this type of system. One is that the journal tape inside the cash register, while it does receive a listing of the individual item prices, identification numbers, totals, etc., associated with the transaction, is left entirely void of any indication as to the identification of the customer making the credit purchase. Thus, the retained copy of the sales check becomes an indispensible element in the sales accounting chain and proper care must be taken to see that the copies are properly filled out, properly stored and tabulated at the end of the day's transactions. Another drawback is, quite obviously, that the separate credit card imprinting operation cuts into the sales clerk's time which could otherwise be spent in generating additional sales. This reduces sales volume and penalizes, in terms of the time required to effect the purchase, the store's best customers—the credit customer. Still another drawback is that the sales clerk may be tempted to short circuit the bother of using both point-of-sale recorders and may forego the use of the cash register altogether, particularly when the credit transaction involves only a small number of items. Thus, the clerk makes out the item portion of the sales check entirely manually and calculates the applicable totals entirely mentally, resulting in a dramatically diminished level of accounting accuracy. Furthermore, the totals in the cash register no longer reflect the entire sales volume of the particular sales station and thus a considerable amount of control is lost over the merchandising operation.

While some recent cash registers have been provided with the capacity to read the customer account number of a particular type of credit card to permit the setting of typewheels whereby the account number is printed on the journal tape, no means are provided in such apparatus for printing any of the credit card data onto the sales check. Thus, these machines do not offer a satisfactory answer to the problem since the use of the separate credit card imprinter is still required on each sales transaction. This solution is further less than entirely satisfactory since the type of credit card with which the apparatus is designed to be used is different from the type of credit card is most general use today. Therefore, a large percentage of present credit merchandisers are not able to use the machine.

OBJECTS AND SUMMARY OF THE INVENTION

It is therefore an object of the present invention to provide a point-of-sale recorder which eliminates all of the aforementioned deficiencies of the prior art systems.

Another object is to provide an improved imprinting device which is an integral part of a cash register and which is adapted to imprint the customer account number directly from the credit card onto the journal tape under cash register control.

A further object is to provide an improved point-of-sale recorder which is an integral part of a cash register and which functions under cash register control to imprint credit card data directly from the credit card onto the sales check.

Still another object is to provide an improved point-of-sale recorder which is integral with a cash register and which functions under cash register control to automatically imprint credit card data onto both the cash register journal tape and the sales check during the total-taking operation of the cash register.

Yet another object is to provide a point-of-sale recorder in accordance with the last-mentioned object wherein the impressions generated both on the journal tape and on the sales check are original impressions, i.e., made through direct contact with the primary ink source of the imprinter.

Still a further object is to provide a point-of-sale recorder which is operable to print from the credit card only the customer account number on the journal tape and both the customer account number and the customer name and address on the sales check.

An additional object is to provide a point-of-sale recorder having both item listing print means and credit card imprint means integrally associated with a cash register and operable, under cash register control, to print on the cash register journal tape a compactly arranged listing including both item prices and totals and the customer credit account number.

Still a further object is to provide a point-of-sale recorder having both item listing print means and credit card imprint means integrally associated with a cash register and operable, under cash register control, to print on the customer sales check a compactly arranged listing including both item prices and totals and the customer credit account number, name and address.

In accordance with a first aspect of the invention, there is provided a print unit operable under direct control of a cash register, or other type of point-of-sale register, wherein a credit card imprinter, having a single credit card imprint position, operates on the totalization cycle of the regster to transfer an impression of the credit card customer account number onto the register journal tape and to transfer an impression of the account number, customer name and address from the credit card onto the sales check. According to a second aspect of the invention, the imprinter is so positioned that the credit card, when inserted, is positioned beneath the journal tape whereby on a first actuation of the imprinter during the totalization operation an impression of the account number is transferred to the tape. Thereafter, the sales check feeding means operates to position a portion of the sales check above the credit card and journal tape whereby on a second actuation of the imprinter during the same totalization operation the account number and customer name and address are transferred to the sales check.

In accordance with another aspect of the invention, the imprinter comprises a platen constructed so as to press an ink source, during the first imprinter actuation, against a portion of the journal tape which overlies the credit card account number and, during the second imprinter actuation, to press the ink source against that portion of the sales check which overlies both the account number and the name and address portions of the credit card.

Still another aspect of the invention calls for the provision impact print means operable in cooperation with the imprinter whereby the journal tape and the sales check documents receive a listing of the item prices and totals associated with the transaction as well as an impression of the credit card data.

Because of the combination of elements provided in accordance with the above-mentioned second aspect of the invention, the imprinter generates an original impression on both the journal tape and the sales check. By this it is meant that the primary ink source of the imprinter (as opposed to interleaved carbon layers, etc.) generates the impression on both documents. Further, it is readily seen that by integrating the imprinting operation into that of the point-of-sale register itself, credit transactions are carried out rapidly, accurately, and with a minimum of inconvenience to both the customer and the sales clerk. The end result is increased customer satisfaction, increased sales volume and more accurate and reliable merchandising accounting information.

It is apparent that the trend in merchandising equipment is going more and more toward automatic reading machines, etc. It will be recognized that since both the journal tape and sales check generated by the printer of the present invention are fully machine-printed documents they are thus highly adaptable to operation with such automatic reading equipment.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIG. 6 is a schematic diagram illustrating the operation of the various cams shown in association with the mechanism of the aforementioned figures.

FIG. 7 is a diagram illustrating the appearance of a portion of a journal tape generated by the print unit of the invention.

FIG. 8 is a diagram showing one form of sales check that may be generated by the print unit of the invention.

FIG. 9 is a schematic diagram illustrating the direction and extent of journal tape shifting which occurs during a totalization cycle.

DESCRIPTION OF THE PREFERRED EMBODIMENT

General description

Figure 1:
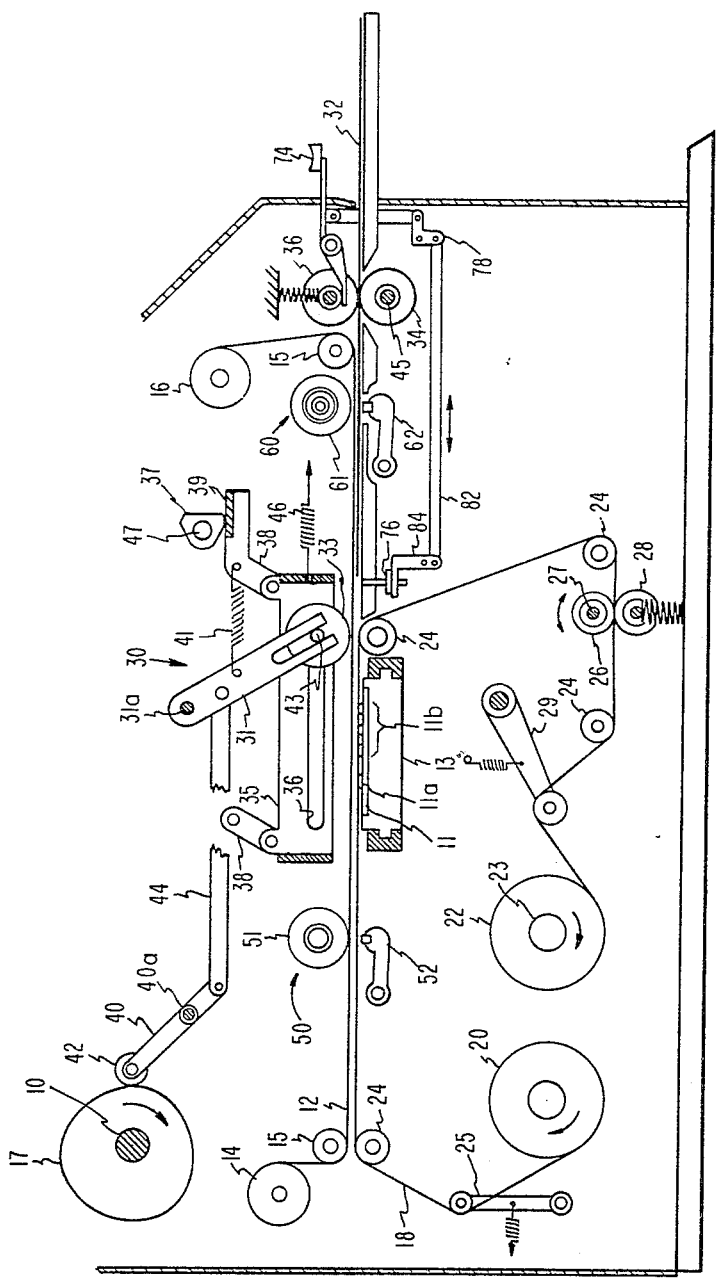
FIG. 1 is a side elevation view of one embodiment of the print unit in accordance with the principles of the invention.

Referring to FIG. 1, a general description of the print unit of the invention is hereafter given. FIG. 1 is a side elevation view of that portion of a cash register employing the print unit of the invention. Shaft 10 is the main cam shaft and rotates 360° clockwise from the position shown each machine cycle. The motor, gear train and controls for rotating the main cam shaft are contained in the cash register unit itself and are not herein described since they are not directly associated with the invention and may be of any preferred design. The same may be said about the cash register unit, per se. The print unit includes an imprinting station 30 and a pair of impact print stations 50 and 60. The ink source for all three print stations is an ink ribbon 12 which is supplied from a supply reel 14 and guided by rollers 15 to a take-up reel 16.

A journal tape is supplied from a reel 20 and wound up on a reel 22. A plurality of guide rollers 24 support the tape in a path which passes through impact print station 50 and imprint station 30. A postively driven feed roll 26 cooperating with a spring loaded pressure roll 28 feeds the journal tape to enable execution of the various print operations in accordance with the invention. A sales check 32 is insertable from the front of the machine and is fed for printing by a feed roll 34 cooperating with a spring loaded pressure roll 36. The sales check is fed through impact printing station 60 and, on credit transaction totalization cycles, is fed into the imprinting station so that it assumes a position between ink ribbon 12 and journal tape 18 whereby the top end of the sales check overlies credit card 11.

The imprinter 30 comprises a platen roller 33 which is driven to the left and then back to the right each machine cycle by a cam 17. The credit card 11 is insertable beneath the journal tape 18 by a slidable tray 13. Embossed on the credit card are a row of characters 11a representing the customer's credit account number and a plurality of rows of characters 11b representing the customer's name, address and any other data which the merchandiser may deem fit to include.

Overall operation of the print unit is as follows. During the itemization portion of the transaction, when the sales clerk is registering each separate purchase item, journal tape 18 and sales check 32 are stepped incrementally to the right and to the left, respectively, through print stations 50 and 60, respectively. Since the print wheels of each of the print stations are set up by the cash register on each itemization cycle to register the item price which is keyed into the machine, a listing of the price of each item of the transaction as well as any additional special coded information which may be keyed into the machine (such as item identification number) is generated on the journal tape and the sales check.

After the itemization portion of the transaction has been completed, a totalization cycle is effected as the final step of the transaction. However, before such a step can be initiated with the present invention, the credit card 11 must be inserted by tray 13 into its proper position beneath the journal tape. Adequate interlock means (not shown) should be provided to prevent the clerk from initiating a totalization cycle without so positioning the credit card. If no credit card is available, a special interlock release may be provided to enable the printing of a "no credit card" code onto the journal tape and to enable keying the customer account number into the machine so that it is printed on the journal tape by print station 50.

When the credit card is in place, triggering of the totalization cycle causes the following sequence of events to occur, first, the journal tape is shifted to the right through a long increment so that the last item previously printed at print station 50 is positioned just to the right of the credit card account number characters 11a. After the journal tape has been thus positioned, the roller platen 33, travelling from right to left, presses the ink ribbon 12 against that portion of the journal tape which lies immediately above the account numerals 11a. This generates an impression of the customer account number on the journal tape. Thereafter, the roller platen 33 and ink source are lifted out of engagement with the journal tape and the roller platen is caused to dwell temporarily in its far left position. During this period of dwell, the journal tape is shifted back to the left so that the just generated account number impression is positioned immediately to the right of print station 50. At the same time, the sales check 32 is fed to the left so that its left-hand end is interposed between journal tape 18 and ink ribbon 12 and is positioned above the raised characters 11a and 11b on the credit card.

After this leftward shifting of the journal tape and sales check has been completed, the roller platen 33 is driven from left to right back to its initial position. The path of the platen during this rightward stroke is controlled so that the ink ribbon is pressed against the surface of the sales check in the areas thereof which overlie all of the raised characters on the credit card. Therefore, the complete customer account number, name and address information is transferred onto the sales check. Of course, no imprinting occurs on the journal tape at this time since there is no source of ink for such an impression. As this last imprinting operation is taking place, print stations 50 and 60 are operated to print the transaction total onto the sales check and journal tape.

Finally, the sales check feed roll 34 is operated to reverse feed the sales check out of the machine. This completes the total print cycle. An example of the arrangement of data on the journal tape is shown in FIG. 7. The data for a single transaction is outlined by the bracket. An example of the sales check generated for the same transaction is shown in FIG. 8.

Detailed Description

*Imprinter.*—The imprinter shown in FIG. 1 is hereinafter described in detail with reference to that figure and to FIG. 4. Imprinter roller platen 33 is driven to the left through a first print stroke and then back to the right through a second print stroke each cash register cycle by a cam 17 mounted on main cam shaft 10. Cam shaft 10, shown in home position, rotates 360° clockwise each machine cycle. A cam follower arm 40 contacts cam 17 through a roller 42 and pivots about stationary pivot point 40a. Follower 40 is connected at its lower end to a drive link 44 which is connected to a pair of slotted drive arms 31 pivotable about stationary pivot 31a. Only one drive arm 31 is shown in the side view of FIG. 1. The slots in the drive arms engage the ends of an axle 43 projecting from either side of platen roller 33. A spring 41 connected between a stationary pivot shaft and arm 31 normally biases the platen roller to the right as shown.

A platen roller support frame 35 has a slot 36 on each side (only one slot 36 is shown in the cut-away side view of FIG. 1). The ends of axle 43 are supported in the slots 36 whereby the platen roller is permitted to be reciprocated horizontally by the arms 31 in a path established by the vertical position of frame 35. The frame 35 is supported on each side by a pair of pivot links 38 such that the frame 35 is mounted as the cross bar in a four-bar linkage. Thus, as links 38 are permitted to pivot counterclockwise, frame 35 is lowered whereby the horizontal path of platen roller 33 is also lowered. A spring 46, which is connected to a stationary point on the right, exerts a rightward bias force on frame 35.

The vertical position of frame 35 is controlled by a cam 37. Cam 37 is normally maintained in the position shown so that follower 39 maintains frame 35 in its upper position whereby platen 33 is held out of printing engagement with the ribbon 12 and journal tape 18. However, on totalization cycles, cam 37 is rotated 360° clockwise and in so doing manipulates the height of roller platen 33 in a manner whereby the roller effects printing only at certain times during the forward and reverse print strokes.

Figure 4:
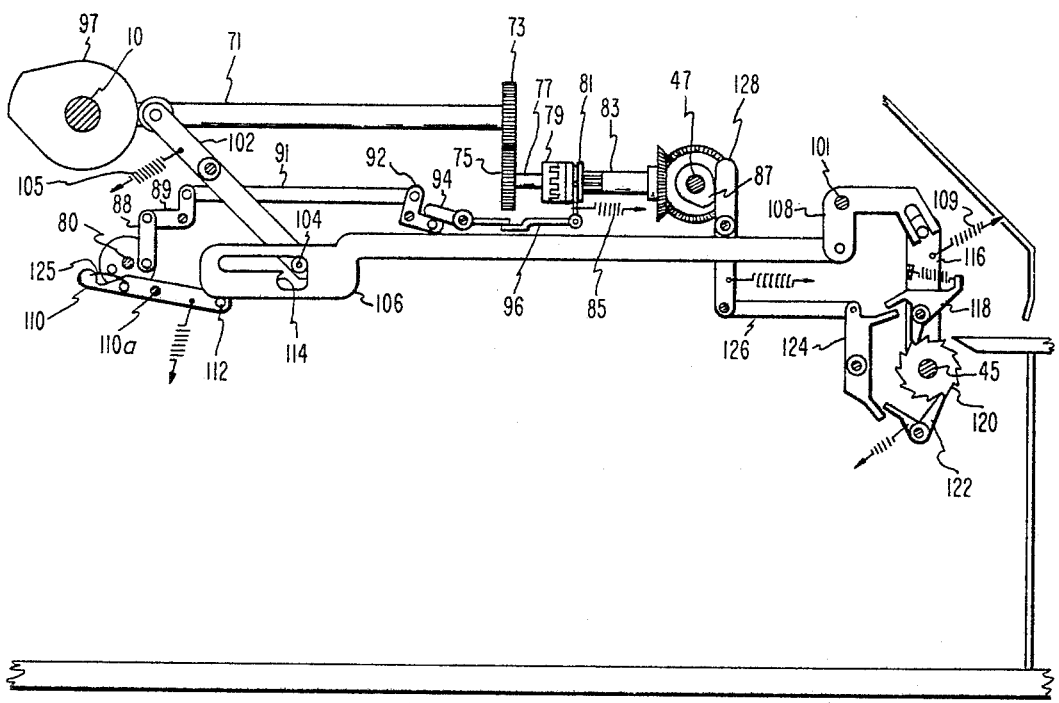
FIG. 4 is a side elevation view of the mechanism employed to drive and control the sales check feed rolls and a portion of the imprinter shown in FIG. 1.

The mechanism for controlling cam 37 is shown in FIG. 4. A shaft 71 is bevel geared to main cam shaft 10 and rotates in a one-to-one relationship therewith. A pair of spur gears 73 and 75 transfer the rotation of shaft 71 to a shaft 77 which serves as the input to a clutch comprising a pair of engageable clutch members 79 and 81. Member 79 is connected to shaft 77 and rotates therewith. Member 81 is splined to clutch output shaft 83, the latter shaft being rotatable independently of input shaft 77. Shaft 83 is bevel geared in a one-to-one relationship with a secondary cam shaft 47 which, besides supporting the imprinter control cam 37 (FIG. 1), also supports a sales check ratchet release cam 87, described subsequently. Thus, when clutch 79–81 is engaged the secondary cam shaft 47 rotates clockwise in one-to-one relationship with main cam shaft 10.

Control mechanism including a control shaft 80 operates to engage clutch 79–81 only during totalization cycles. Control shaft 80 extends into the main portion of the cash register mechanism and is controlled thereby to assume the position shown in FIG. 4 when the cash register is being operated in the totalization mode and to assume a position displaced approximately 30° counterclockwise from that shown in FIG. 4 when the cash register is being operated in the itemization mode. Thus, during itemization, shaft 80 operates to position the linkage system 88, 89 and 91 such that bell crank 92 is in a position of angular displacement somewhat clockwise of the position shown in FIG. 4. This causes pivot member 94 to be rocked by a spring 85 counterclockwise from the position shown whereby clutch member 81 is drawn out of engagement with member 79. During itemization cycles, therefore, secondary cam shaft 47 does not rotate and the imprinter roller platen 33 is maintained by frame 35 in the upper position shown in FIG. 1. Thus the imprinter does not cause printing during itemization cycles, even though it is driven back and forth by the rotation of cam 17 (FIG. 1).

During totalization cycles, control shaft 80 places the linkage system 88, 89, 91, 92 and 94 into the position shown in FIG. 4 whereby the clutch is engaged and secondary cam shaft 47 rotates 360° with the main cam shaft 10.

A preferred manner in which to operate control shaft 80 is by means of a camming sector or control slide operating in conjunction with the key studs of the keys in the cash register control keybank. This is a technique of control very well known to the cash register art. Basically, the control sector or slide has a camming lug in position to coact with the stem of each cash register control key. Each camming lug associated with a non-totalization key has a first degree of camming incline while the lugs associated with the totalization keys have a second degree of camming incline. Depression of a non-totalization key moves the control sector or slide a first amount while depression of a totalization key moves it a second amount. An appropriate linkage system is provided to transfer the movement of the control sector or slide to the control shaft 80. Appropriate restoration mechanism may be provided to restore the shaft 80 and the control sector or slide back to some predetermined home position at the end of each machine cycle.

Referring back to FIG. 1, the credit card 11 is carried on a slidable support tray 13 whereby the credit card may be easily placed into the proper operative relationship with the roller platen 33. The credit card has a first row of raised characters 11a representing the customer credit account number and a plurality of additional rows of raised characters 11b representing the customer's name and address. Of course, any additional data may be provided on the credit card in accord with the specific merchandiser's requirements.

Referring to FIG. 1 and to the cam diagram of FIG. 6, the imprint cycle is as follows. After 10° of rotation of the main cam shaft, cam 17 begins pivoting follower arm 40 in a clockwise direction. This pivoting movement continues for the next 100° of cam shaft rotation until, at 110°, cam 17 reaches its high dwell. The clockwise pivoting of follower arm 40 draws the roller platen drive arms 31 clockwise, moving roller platen 33 right to left through its first print stroke.

During the first 50 degrees of main cam shaft rotation, cam 37 remains at its high dwell and thus the imprinter frame 35 remains in its upper position whereby the roller platen and ink ribbon are kept out of contact with the journal tape. From 50 degrees to approximately 80 degrees of the cycle, the dwell of cam 37 declines and follower arm 39 rocks counterclockwise under the influence of spring 46. This lowers frame 35 so that when cam 37 reaches its low dwell at 80 degrees of cam shaft rotation, roller platen 33 presses the ink ribbon into printing engagement with the journal tape. At the time of initial print contact, roller platen 33 is positioned just to the right of the account number characters 11a. Thus, in completing its leftward print stroke, roller platen 33 causes only an impression of the characters 11a to be generated on the journal tape.

When the roller platen reaches its leftmost position at 110 degrees of cam shaft rotation, cam 37 begins to lift frame 35 upwardly whereby, at 130 degrees of rotation, the roller 33 is in its uppermost position and is out of printing engagement with the ink ribbon and journal tape. At 200 degrees, cam 17 allows follower 40 and the arms 31 to be rocked counterclockwise under the influence of spring 41 until 300° of rotation, whereupon cam 17 reaches its low dwell. This action effects a rightward print stroke whereby roller platen 33 is drawn back to its home position by spring 41. From 170° to 200° of the cycle, cam 37 decreases in radius and reaches its low dwell at 200°. This condition of low dwell is presented to follower arm 39 for the entire duration of the rightward print stroke and thus the roller platen is maintained in the print plane throughout the full stroke. This therefore causes an impression of all raised characters 11a and 11b to be generated on the document which lies beneath ink ribbon 12. As will be explained subsequently, the document occupying this position during the rightward print stroke is the sales check 32.

Ink ribbon 12 is supplied from spool 14 and is guided through its path by guide rollers 15. Take-up spool 16 is driven by appropriate incrementing mechanism (not shown) so that fresh ink is continually being supplied to the three print stations.

*Impact print stations.*—Each of the impact print stations 50 and 60 (FIG. 1) is of conventional design. Type wheels 51 and 61 are rack-actuated and operate in unison with the cash register display wheels. The number of print wheels required at each station is determined by the number of digit positions desired in the total print field. As suggested in the example documents of FIGS. 7 and 8, there should be five print wheels for the five digit item identification code field, another four or five print wheels for the price field and one further print wheel for the function code character following the price.

At least one print hammer is associated with each set of print wheels. Thus, the hammers 52 and 62 must be wide enough to span the entire print field. Alternatively, an individual hammer may be provided for each print wheel. This allows for suppression of printing from certain print wheels when desired. Still another alternative would be to supply one print hammer for the item code field, another print hammer for the price field and a third print hammer for the function code field.

The mechanism for firing the hammers may be any suitable mechanism, preferably of the piano-action type, which is controlled to fire, as shown in FIG. 6, at approximately 200° of the cam cycle. Since the specific hammer firing mechanism plays no part in the present invention, further description thereof is omitted for the sake of brevity.

*Journal tape feed.*—As shown in FIG. 1, the journal tape 18 is supplied from reel 20 and is taken up by reel 22. The journal tape path established by guide roll 24 causes the tape to pass through impact print station 50 and imprint station 30. A pair of tension arms 25 and 29 are required for proper slack take-up during the periods of forward and reverse tape shifting as described hereinafter. Feed roll 26 mounted on drive shaft 27 cooperates with a pressure roll 28 to feed the tape. The mechanism for controlling the operatiton of drive shaft 27 and the take-up reel shaft 23 is shown in FIGS. 2, 3a and 3b and is hereinafter described in detail.

Figure 2:
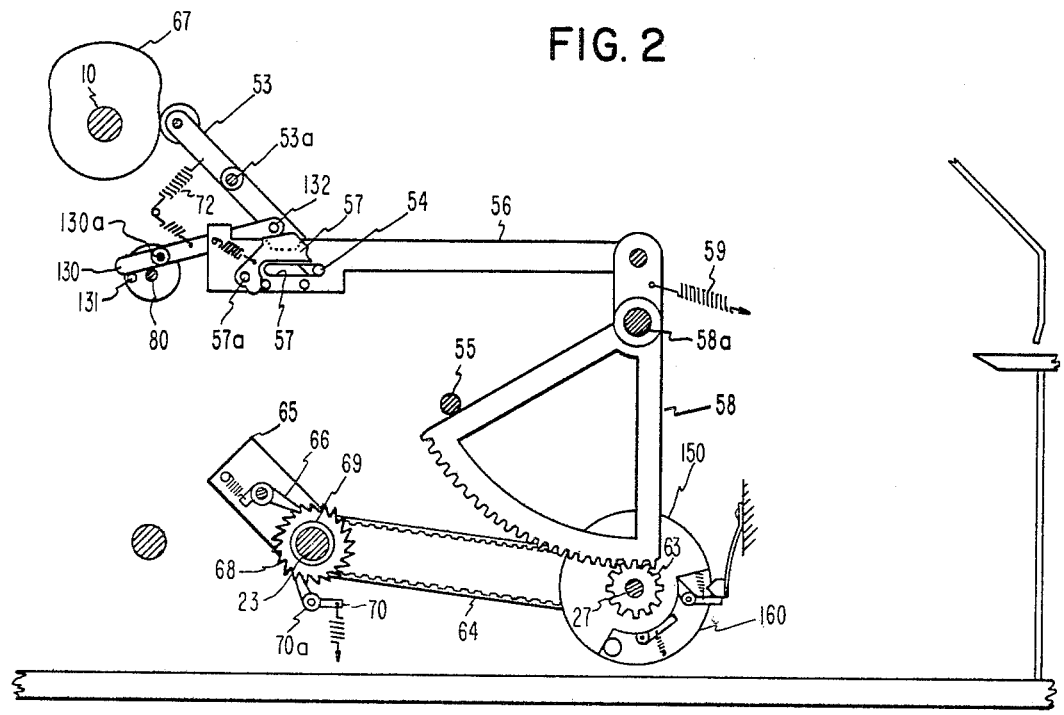
FIG. 2 is a side elevation view of the mechanism employed to drive and control the journal tape feed rolls of FIG. 1.

As shown in FIG. 2, a journal tape incrementing cam 67 is mounted on main cam shaft 10 and undergoes 360° clockwise rotation from the home position shown each machine cycle. During itemization cycles, the mechanism operates to drive feed roll shaft 27 through a short clockwise angular increment at the beginning of each cycle. This incremental feeding enables line-by-line spacing of the item price list which is printed on the journal tape at impact print station 50. Cam 67 pivots a follower arm 53 clockwise about stationary pivot shaft 53a during a period of time beginning at 10 degrees of main cam shaft rotation and extending to approximately 40° of cam shaft rotation (FIG. 6). A pin 54 on the lower end of follower arm 53 engages in a slot 57 in an actuator arm 56 connected to a sector gear 58 which is pivotable about shaft 58a. The length of slot 57 is such that pin 54 engages the left-hand end of the slot only a few degrees prior to the termination of the clockwise pivot movement of follower 53. Thus, during the initial portion of the movement of follower 53, spring 59 holds sector 58 in the position shown and pin 54 idles in slot 57. When pin 54 engages the left end of slot 57, the final few degrees of movement of arm 53 causes sector 58 to rock counterclockwise, imparting a small angle of clockwise rotation to a pinion 63 which is connected to a pawl-carrying disk 150 freely rotatable about journal tape feed roll drive shaft 27.

Figure 3A:
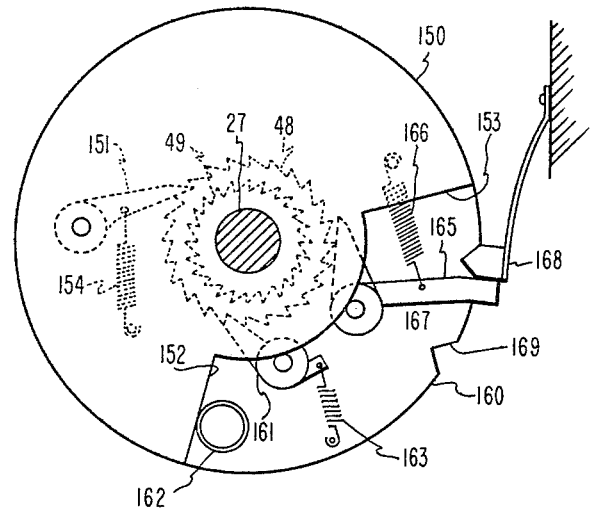
FIGS. 3a and 3b are a side elevation view and bottom plan view, respectively, of the journal tape feed roll drive shaft control ratchet shown in FIG. 2.
Figure 3B:
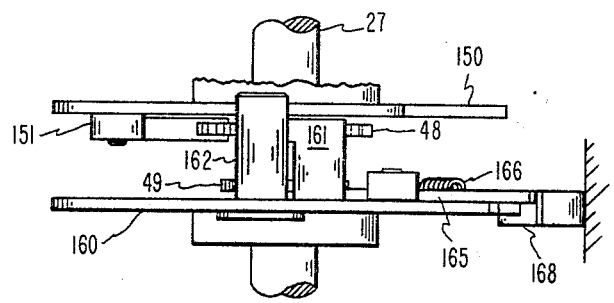

As shown in the more detailed drawings of FIGS. 3a and 3b, disk 150 supports on its back side a drive pawl 151 which engages, under the influence of a spring 154, a ratchet wheel 48 connected to shaft 27. The small angle of clockwise rotation imparted to pinion 63 and disk 150 by sector 58 causes pawl 151 to drive ratchet wheel 48 and shaft 27 through a similar clockwise angle. This motion causes the journal tape feed roll 26 (FIG. 1) to increment the journal tape to position it in preparation to receive the next item price impression at impact station 50.

A second disk 160, independent of disk 150 and also freely rotatable about shaft 27, is mounted behind disk 150 and, during itemization cycles, is held stationary by detent 168. Mounted on disk 160 is an anti-reverse pawl 161 spring loaded into engagement with ratchet wheel 48 by spring 163. Pawl 161 holds the shaft 27 stationary as follower arm 53 rocks back to its home position and in so doing causes pinion 63 and disk 150 to rotate counterclockwise back to their home position.

Referring back to FIG. 2, rotation of shaft 27 is transferred via a timing belt 64 to a pawl carrier 65 mounted to rotate about journal tape take-up reel shaft 23. A drive pawl 66 mounted on carrier 65 is spring-loaded into engagement with a ratchet wheel 68 connected by a spring-wrap overload friction clutch 69 to shaft 23. Clockwise rotation is thus imparted to shaft 23 each time shaft 27 is stepped clockwise to feed the journal tape. This rotation of shaft 23 causes take-up reel 22 (FIG. 1) to wind up that amount of journal tape which has been fed. The amount of angular travel imparted to ratchet wheel 68 in response to each clockwise incrementing of shaft 27 is sufficient to completely take up the fed tape when reel 22 is at its smallest diameter. As tape is taken up and the diameter of reel 22 increases, the amount of rotation imparted to ratchet wheel 68 is more than adequate to take up the amount of tape fed. Spring-wrap clutch 69 therefore yields and slips on shaft 23 during the latter portion of each such incremental rotation of ratchet 68. An anti-reverse pawl 70, pivotable about stationary pivot 70a, prevents reverse rotation of ratchet 68. Ratchet 68 is wide enough to accommodate both pawls 66 and 70, preventing interference therebetween when carrier 65 undergoes 450° rotation during each totalization cycle, as explained subsequently.

The only control required on supply reel 20 is an appropriate amount of drag torque to keep tension on the tape. This may be applied through any conventional drag torque generator.

The movement required of the journal tape on a totalization cycle is illustrated in FIGS. 7 and 9. As shown in FIG. 7, it is desired to imprint the customer credit account number (B) immediately adjacent the last item (A) listed on the tape at impact print station 50. Furthermore, after the account number has been imprinted, it is desired to print the total (C) set up at impact print station 50 immediately adjacent the just-imprinted account number. The journal tape manipulation required to achieve this data arrangement is illustrated in FIG. 9. The clockwise excursion of follower 53 (FIG. 2) at the beginning of the totalization cycle (10° to 40° of cam shaft rotation) shifts the journal tape 18 to the right through a distance I so that the item last printed at station 50 is moved to a position just to the right of the credit card account number characters 11a. After imprinting has been performed on the journal tape and before actuation of the print hammers 52, the journal tape is shifted to the left through a distance II so that the just-imprinted account number is positioned immediately to the right of print station 50. This latter shift is effected by the counterclockwise return movement of follower 53 which occurs at 130° to 160° of the cam cycle.

The mechanism shown in FIGS. 2, 3a and 3b accomplishes the above generally described shifting movements as follows. Just prior to initiation of the totalization cycle, control shaft 80 is rotated approximately 30° clockwise in the manner hereinbefore described whereby a pivot arm 130, pivotable about stationary pivot 130a, is rocked clockwise. A pin 132 carried on the end of arm 130 causes an interposer 57 pivoted on actuating arm 56 at 57a to be moved into the path of pin 54. Thus, when follower arm 53 undergoes its clockwise excursion it begins moving actuator arm 56 almost immediately and carires it to the left for substantially the full stroke of arm 53. This causes sector gear 58 to pivot counterclockwise through a long arc whereby pinion 63 and disk 150 are rotated approximately one and one quarter revolutions in a clockwise direction. This amount of rotation of disk 150 causes drive pawl 151 (FIG. 3a) to impart an equal rotation to shaft 27 whereby the journal tape feed roll 26 feeds the journal tape an amount corresponding to the distance I shown in FIG. 9.

During approximately the first 98 degrees of this clockwise rotation of disk 150, disk 160 remains stationary under the influence of detent 168. However, when the trailing shoulder 153 of the recess in the periphery of disk 150 contacts a pin 162 connected to disk 160, disk 160 begins rotating clockwise along with disk 150. As soon as disk 160 begins its clockwise movement, the tail on a pawl 165 mounted on disk 160 disengages detent 168 and spring 166 pivots the pawl into engagement with the teeth of a second ratchet wheel 49 connected to shaft 27. When the counterclockwise movement of sector gear 58 terminates, detent 168 engages a notch 169 in the periphery of disk 160.

When follower arm 53 undergoes its return (counterclockwise) excursion during the period extending from 130° to 160° of the cam cycle, sector gear 58 is driven clockwise back to its home position as established by stop 55. This imparts approximately one and one quarter revolutions of reverse (counterclockwise) rotation to pinion 63 and disk 150. As is apparent from FIG. 3a, the first 98° of this reverse rotation does not impart reverse rotation to feed roll drive shaft 27 since pawl 151 idles on ratchet wheel 48 and disk 160 is held stationary by engagement of detent 168 with notch 169. After the first 98 degrees of reverse rotation, shoulder 152 of disk 150 engages pin 162 so that disk 160 rotates with disk 150 and is carired back to home position. During this period of counterclockwise rotation of disk 160 pawl 165 imparts, through ratchet wheel 49, an equal amount of counterclockwise rotation to drive shaft 27. This rotation causes feed roll 26 to reverse feed the journal tape through a distance corresponding to distance II shown in FIG. 9.

Tension arm 25 (FIG. 1) takes up the slack created in the journal tape by this reverse feeding. The supply of tape for this feeding is provided by a combination of reverse (counterclockwise) rotation of reel 22 and yielding of tension arm 29. Reverse rotation of reel 22 is permitted through slippage of spring-wrap clutch 69 (FIG. 2) after the slippage torque has been exceeded.

*Sales check feed.*—As shown in FIG. 1, the feed roll 34 mounted on drive shaft 45 coacts with spring-loaded pressure roll 36 to feed the sales check 32 through the impact print station 60 and to the imprint station 30. To insert the sales check and position it properly for printing, the clerk depresses a key 74 to lift pressure roll 36 out of engagement with drive roll 34. Also, this action pivots a bell crank 78 clockwise causing a connecting link 82 to pivot a lifting bail 84 so that a pin 76 is interjected upwardly into the path of the sales check. The clerk simply slides the sales check inwardly until it contacts the pin 76. This indicates that the check is properly positioned and the clerk then releases the key 74 to cause the check to be gripped between the rolls 34 and 36 and to cause pin 76 to be removed from the feed path.

Figure 5:
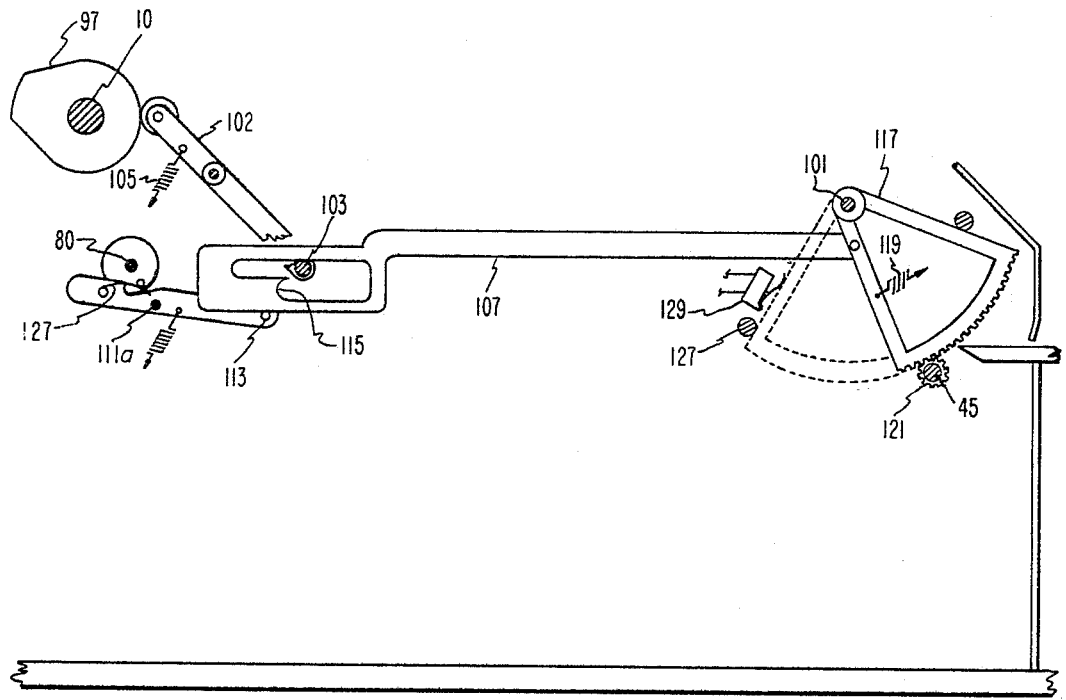
FIG. 5 is a side elevation view of further drive and control mechanism employed in connection with the sales check feed rolls.

The mechanism for controlling the feed roll drive shaft 45 is shown in FIGS. 4 and 5. The mechanism shown in FIG. 4 is that which drives the shaft 45 to feed the sales check on a line-by-line basis to allow listing of the items at print station 60 during itemization cycles. The mechanism shown in FIG. 5 is positioned in the machine directly behind the mechanism shown in FIG. 4 and is that which operates on the totalization cycle to feed the sales check to the proper position for imprinting and then reverse feeds the sales check out of the machine at the end of the cycle.

Referring to FIG. 4, a cam 97 on main cam shaft 10 operates to pivot a follower arm 102 clockwise during a period from 130° to 160° of the cam cycle and permits the arm 102 to rock counterclockwise back to its home position under the influence of spring 105 during the period from 180° to 210° of the cam cycle. During the totalization cycle the control shaft 80 is in the position shown so that a pivot arm 110, pivotable about stationary pivot 110a, maintains an actuating arm 106 in its lower position (as shown). When follower 102 rocks clockwise, a pin 104 mounted on its lower end idles in the elongated upper portion of the slot in actuator arm 106. Thus, during totalization cycles actuator arm 106 is not operative to cause sales check feeding and is maintained in the position shown by a spring 109 acting on pawl carrier 116.

During an itemization cycle, control shaft 80 is displaced approximately 30° in a counterclockwise direction from the position illustrated in FIG. 4. This causes pivot arm 110 to be rocked counterclockwise whereby pin 112 urges actuating arm 106 upwardly. In this condition, pin 104 on follower 102 engages a shoulder 114 in the slot in actuating arm 106 when the follower arm begins its clockwise excursion. As that excursion continues, actuating arm 106 is pulled to the left. This action pivots a crank 108 about stationary shaft 101 whereby pawl carrier 116, which is rotatable about shaft 45, is rocked a few degrees counterclockwise and a drive pawl 118 mounted on the carrier imparts this counterclockwise movement to a ratchet wheel 120 mounted on drive shaft 45. This imparts counterclockwise rotation to feed roll 34 (FIG. 1) and feeds the sales check to the next print line whereby it is in position to receive the next item on the list.

During the period from 180° to 210° of the cam cycle actuating arm 106 is moving back to the right to return pawl carrier 116 back to its home position. During this time anti-reverse pawl 122 prevents reverse rotation of drive shaft 45.

It should be noted that pivot arm 110 has a leaf spring 125 to provide the relief necessary when actuating arm 106 is driven to the left. Actually, the movement of arm 106 is to the left and down owing to the radius of follower arm 102. Thus, unless spring 125 were provided, arm 106 would bind against pin 112 and the mechanism would jam.

The mechanism for controlling sales check feeding during a totalization cycle is shown in FIG. 5. This mechanism is driven from the same cam 97 and follower arm 102. An actuating arm 107 is manipulated by a pin 103 protruding from the back side of the lower end of follower arm 102. Actuating arm 107 is selectively positionable in either an upper or a lower position by a pivot arm 111 coacting with the control shaft 80. As shown in FIG. 5, the control shaft 80 is in the itemization position. Actuating arm 107 is thus in its lower position so that pin 103 idles in the elongated portion of the slot in arm 107. Thus, during itemization cycles follower arm 102 has no drive control over actuating arm 107. However, actuating arm 107 is connected to a sector gear 117 which is pivotable about stationary shaft 101. The teeth on the sector gear cooperate with a pinion 121 connected to drive shaft 45. Thus, during itemization each increment of counterclockwise rotation imparted to shaft 45 by the ratchet mechanism of FIG. 4 causes sector gear 117 to be displaced a small angular increment in the clockwise direction against the bias of spring 119. Each such incremental movement of sector gear 117 of course shifts actuating arm 107 to the left.

On a totalization cycle, control shaft 80 is rotated to a position displaced approximately 30 degrees clockwise from the position shown in FIG. 5 so that pivot arm 111 is rocked counterclockwise about its stationary pivot 111a. A pin 113 on the end of arm 111 lifts actuating arm 107 into its upper position whereby the pin 103 on follower arm 102 engages a shoulder 115 in the slot in actuating arm 107 when follower arm 102 undergoes its clockwise excursion. After pin 103 engages shoulder 115, it drives actuating arm 107 to a predetermined position at the left whereby sector gear 117 engages a fixed limit stop 127 and closes a switch 129. This rotation of the sector gear imparts the required amount of counterclockwise rotation to drive shafe 45 to feed the sales check so that the top portion thereof overlies the credit card 11 at the imprint station (FIG. 1). The amount of clockwise movement experienced by follower arm 102 before pin 103 picks up shoulder 115 depends upon the number of itemization cycles which had been executed prior to the totalization cycle. It can be seen that regardless of the number of such itemization cycles, the pin 103 always drives actuating arm 107 and sector gear 117 to the same predetermined position during the totalization cycle. Each sales check is thus always positioned for imprinting at exactly the same location regardless of the number of previous itemization cycles.

The switch 129 is provided to actuate an interlock associated with the cash register keyboard. This interlock prevents the operator from taking any further itemization cycles and requires the initiation of a totalization cycle. The reason for this interlock is obvious since the total number of itemization cycles which can be taken is limited by the amount of clockwise rotation allowed sector 117.

It is to be noted that pivot arm 111 is also provided with a relief spring 127 to permit the leftward and downward movement of actuating arm 107 during totalization cycles.

After imprinting on the sales check has been completed, cam 87, shown in FIG. 4, kicks pivot arm 128 clockwise, causing connecting link 126 to rock a release arm 124 counterclockwise whereby drive pawl 118 and anti-reverse pawl 122 are lifted out of engagement with the ratchet wheel 120. Spring 119 (FIG. 5) then returns sector gear 117 counterclockwise to its home position. During this movement sector 117 drives shaft 45 clockwise, causing feed roll 34 to reverse feed the sales check back to its initial position. The clerk then depresses key 74 to release the pressure roll 36 and removes the sales check.

Operation

Referring now to FIGS. 1 through 6 a description of the overall operation of the print unit is hereinafter given. Inasmuch as the detailed operation of each individual sub-component of the unit has already been set forth, the following description is directed only to the general sequence of overall operation for the purpose of tying together the several sub-component operational descriptions given above. The primary figure to be referred to in the following is the camming diagram of FIG. 6, which illustrates one full cycle of machine operation.

On each itemization cycle the following takes place. The individual elements of the unit remain in the positions shown in FIG. 1 until the main cam shaft reaches ten degrees of rotation. At that point cams 67 and 17 (FIGS. 2 and 1, respectively) begin driving their respective followers in a clockwise direction. The initial movement of follower 53 does not cause movement of actuating arm 56 due to slot 57. The initial movement of follower 40 begins drawing roller platen 33 to the left. At approximately 35 degrees of the cam cycle, follower 53 pulls actuator 56 to the left and drives journal tape feed roll 26 to feed the journal tape 18 one increment to the right (FIG. 1). This positions the journal tape for the next item printing operation at station 50.

At 110° of the cam cycle the roller platen 33 has reached its far left position but has caused no imprinting on the journal tape since cam 37 is inoperative on itemization cycles.

At 130°, (FIG. 4) follower 102 begins its clockwise excursion and during this excursion which lasts until 160° of the cycle, draws actuating arm 106 to the left whereby the sales check feed roll 34 (FIG. 1) feeds the sales check one increment to the left to position it to receive the next line of item printing at station 60.

At 200° the print hammers 52 and 62 of the two impact print stations fire, causing printing on the journal tape and sales check of the item price and identification data which has been set up on the print wheels 51 and 61 by the cash register unit.

During the period extending from 200° to 300° of the cam cycle, the roller platen 33 is driven to the right back to its home position. Again, no imprinting occurs.

Each itemization cycle repeats in accordance with the above sequence whereby the individual items of the transaction are listed on both the journal tape and sales check. In the example transaction shown in FIGS. 7 and 8, the first item is item number 73214 priced at $1.29. Note that since the journal tape increments to the right and the sales check to the left the item lists are inverted on the two documents. The last item in the transaction is item 16247 priced at $0.99.

At the beginning of the totalization cycle, the control shaft 80 (FIGS. 4 and 5) is rotated to shift actuating arms 106 and 107 to their lower and upper positions, respectively. Also the shaft 80 engages the clutch 79–81 and (FIG. 2) places interposer 57 into the path of pin 54.

At ten degrees of the ensuing totalization cycle follower arm 53 (FIG. 2) begins its clockwise excursion but this time actuating arm 56 begins its movement to the left substantially immediately. This drives the journal tape feed roll 26 (FIG. 1) through a long clockwise feed increment corresponding to the distance I of FIG. 9 to place the journal tape in position to receive the imprint of the customer account number.

As this forward shifting of the journal tape is taking place, roller platen 33 begins its movement to the left under the influence of cam 17. At 80°, cam 37 causes the roller platen to be lowered into the print plane and, at the time this occurs, the roller platen is positioned just to the right of the account number characters 11a (FIG. 1) of the credit card. The roller platen remains in the print plane until 100° of cam rotation and thus generates the account number impression on the journal tape. At 110° of cam rotation the leftward print stroke of the roller platen is complete and by 130° cam 37 has lifted the roller platen out of the print plane.

Between 130° and 160° of the cam cycle cam 67 (FIG. 2) causes the journal tape to be shifted to the left by an amount corresponding to distance II shown in FIG. 9. During this same interval cam 97 (FIG. 5) causes the sales check to be shifted to the left so that the top portion thereof is positioned over the journal tape and the credit card.

At 170° cam 37 (FIG. 1) begins to lower the roller platen back into the print plane. At 200° the platen has been established in the print plane and at the same time cam 17 begins driving the platen to the right, beginning the second print stroke. Also, at 200° the print hammers 52 and 62 fire to print the totals on the journal tape and sales check.

At 300° of the cam cycle the second print stroke is complete and the customer account number, name and address have been imprinted on the sales check. Also at 300° cam 37 begins lifting the roller platen out of the print frame. At 320° cam 87 (FIG. 4) begins rocking follower 128 clockwise whereby the sales check drive shaft 45 is released from pawls 118 and 120 and spring 119 (FIG. 5) acting through sector 117 reverse feeds the sales check out of the machine.

As shown in FIG. 8, the full credit card information appears at the top of the sales check and the total appears at a fixed location at the bottom. This same total appears just above the credit card account number on the journal tape, as shown in FIG. 7. Of course, the legends "XYZ department store," "customer," "item," "price" and the box labeled "total" are all pre-printed on the sales check.

The merchandiser identification code print field of print station 60 is suppressed on the totalization cycle. However, printing of this field is not suppressed on the journal tape since it may be desirable to use this field for the customer account number when, for example, the customer does not have his credit card with him during the purchase. In this case the clerk would key in the account number using the merchandise identification code keys (which are normally not used during a totalization cycle).

Throughout the preceding description it was assumed that every totalization cycle was a credit totalization cycle calling for imprinting. It is, of course, to be understood that in cash register applications where cash as well as credit transactions are handled, some means should be provided to inhibit the operation of the imprinter and the impact print station 60 on non-credit totalization cycles not involving a credit card or a sales check. It may also be desirable to inhibit the long forward-backward journal tape shifting sequence on non-credit totalization cycles. Also, it may be desirable to provide the usual cash receipt tape feed and print means for use during cash transactions.

While the invention has been particularly shown and described with reference to a preferred embodiment thereof, it will be understood by those skilled in the art that the foregoing and other changes in form and details may be made therein without departing from the spirit and scope of the invention.

We claim:
1. In an imprinter, the combination comprising:
   a bed adapted to support a print member having raised characters;
   first feeding means for delivering a first document into a position overlying said print member;
   an ink source;
   print means for pressing said ink source against said first document to create thereon an impression of the characters on said print member;
   second feeding means for feeding a second document to a position intermediate said first document and said ink source; and drive means for operating said print means twice and said second feeding means once, the operations of said second feeding means occurring between the operations of said print means.

2. The imprinter set forth in claim 1, wherein said print means comprises:

a reciprocable roller platen adapted to be driven by said drive means across a portion of said first document in a first direction during said first print operation and across a portion of said second document in the opposite direction during said second print operation.

3. The imprinter set forth in claim 2 wherein said drive means further includes:

means for controlling said roller platen to place it in contact with said documents at different times during said two print operations, whereby said first document receives an impression of one group of said raised characters and said second document receives an impression of a different group of said raised characters.

4. The imprinter set forth in claim 3 wherein said control means is constructed and arranged to place said platen in contact with said documents during said two print operations such that said different group of raised characters includes said one group of said raised characters.

5. The imprinter set forth in claim 4 wherein the axis of said roller platen is transverse to said print member and said roller platen is movable toward and away from said print member by said control means during reciprocation by said drive means.

References Cited

UNITED STATES PATENTS

| | | | |
|---|---|---|---|
| 1,726,541 | 9/1929 | Cole | 101—260 |
| 3,272,120 | 9/1966 | Johnson | 101—269 X |

WILLIAM B. PENN, Primary Examiner

U.S. Cl. X.R.

101—113, 279, 283